(No Model.)
M. DEPREZ & J. CARPENTIER.
REGULATOR FOR DYNAMO ELECTRIC GENERATORS.
No. 348,385. Patented Aug. 31, 1886.
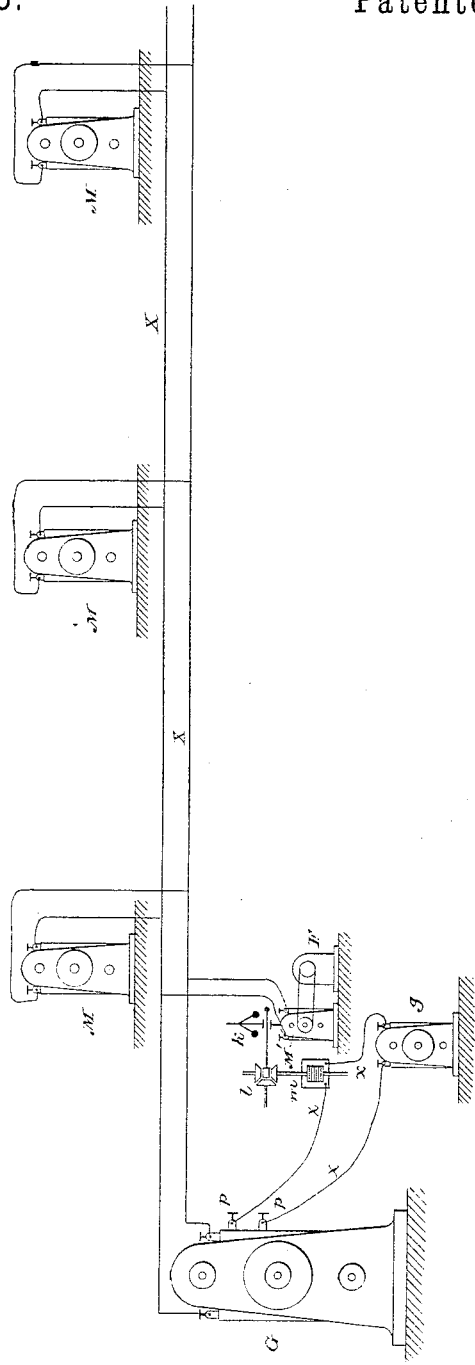
WITNESSES:
E. B. Bolton
Geo. Bainton
INVENTORS:
Marcel Deprez and
Jules Carpentier
By their Attorneys,
Burke Frazer Connett

UNITED STATES PATENT OFFICE.

MARCEL DEPREZ AND JULES CARPENTIER, OF PARIS, FRANCE.

REGULATOR FOR DYNAMO-ELECTRIC GENERATORS.

SPECIFICATION forming part of Letters Patent No. 348,385, dated August 31, 1886.

Application filed December 1, 1881. Renewed August 3, 1886. Serial No. 210,036. (No model.) Patented in France April 5, 1881, No. 142,140; in Germany August 16, 1881, No. 23,448; in England September 24, 1881, No. 4,128; in Belgium September 24, 1881, No. 55,819; in Italy October 20, 1881, No. 477; in Austria December 17, 1881, No. 33,122, and in Spain January 28, 1882, No. 2,173.

*To all whom it may concern:*

Be it known that we, MARCEL DEPREZ and JULES CARPENTIER, both citizens of the French Republic, and residents of Paris, France, have invented certain new and useful Improvements in the Regulation of Dynamo-Electric Generators, and in the regulation and distribution of electric energy supplied thereby, of which the following is a specification.

The object of this invention is the regulation of the production of electric energy and its distribution and division from a central generating source through a system of distributing-conductors. We employ the usual arrangement of one or more dynamo-electric generators installed at a central station, with conductors leading from the opposite electrodes thereof to the several points where the electric energy is to be utilized. At these points there are placed electric lamps, electromotors, or other devices to be fed or operated by the electric power, and these may be installed either in derivation or in series. In such a system none of the several devices fed by the current from the same generator should be affected by the connection of other of the said devices with the circuit, or by their disconnection therefrom. To fulfill this condition requires a suitable regulation of the generator to adapt its action to the varying demands upon it under different circumstances. If the several devices are installed in derivation, the difference in potentials at the binding-posts of the generator should be rendered constant. If the devices are in series, the current from the generator should be rendered constant. This regulation of the generator has been attempted in various ways, all more or less complicated or unsatisfactory. In the most perfect automatic system heretofore employed for this purpose an electrometer is employed, acting as a relay to control the action of an accessory motor which operates a rheostat, interposing more or less resistance in the inductor-circuit of the field-magnets. By means of our invention we are enabled to attain this result by more simple means, which we will now describe, with reference to the accompanying drawing, wherein the devices to be fed by the current are shown as electromotors for the electric transmission of power.

The figure of the accompanying drawing is a diagram of a circuit, showing the application of our invention.

G is a dynamo-electric generating-machine producing a continuous current in one direction. X X is a circuit leading therefrom, and M M are a series of electromotors installed in said circuit. These motors are shown as installed in derivation; but they may be in series, if preferred. These motors should all be run at a uniform speed, notwithstanding they may have different amounts of work to perform. The exciting-coils of the field-magnets terminate in binding-posts $p$ $p$, to which are joined the wires of an independent exciting-circuit, $x$, which is fed by a generator, $g$, which may be a magneto-electric machine or a battery.

M' is an electromotor arranged at the generating-station and driven from the circuit X, to which it is joined in derivation if the motors M M are in derivation, and in series if they are in series. This motor we call a "temain" or "tell-tale." It has a uniform work to do in driving the friction brake or machine F, or in overcoming any other fixed resistance. If the movement of any of the motors M M on the circuit is modified, the speed of all the other motors, including the motor M', is correspondingly affected. We utilize the variations in the speed of the motor M' for automatically regulating the electric energy furnished by the generator G. The motor M' drives a centrifugal governor, $k$, which acts, by its rise and fall, on a reversing-clutch, $l$, which, by power communicated through the horizontal shaft in the figure, turns the vertical shaft to either the right or left, and thereby operates a rheostat, $m$, to throw more or less of its resistance-coils into the circuit $x$. This varying resistance causes a variation of the current in the circuit $x$, and consequently in the magnetization of the field-magnets of the generator, and in the tension of the current which the generator supplies to the circuit X.

By this apparatus we are enabled to dispense with the electrometer heretofore used.

We claim as our invention—

1. The combination of a dynamo-electric generator, a distributing-circuit supplied thereby, a number of electromotors, electric lamps, or other consumers of electric energy installed in said circuit, a tell-tale or temain electromotor installed therein under substantially the same conditions as the said motors, lamps, &c., an independent circuit traversing the exciting-coils of said generator, a source of electric current supplying said circuit with a uniform current, unaffected by the fluctuation in the distributing-circuit, means, substantially as described, for varying the current supplied by said circuit to the exciting-coils, and suitable connections between said means and the temain motor, whereby the variations of speed in said motor shall effect corresponding variations in said exciting-current, substantially as described and shown.

2. The combination of distributing-circuit X X, generator G, supplying said circuit, temain motor M', a centrifugal governor, $k$, driven thereby, a reversing-clutch, $l$, adapted to be operated by said governor, a rheostat, $m$, adapted to increase or decrease its resistance by the rotation of said reversing-clutch in one direction or the other, an exciting-generator, $g$, and a circuit, $x$, independent of the distributing-circuit, fed by the generator $g$, traversing the exciting-coils of the field-magnets of the generator G, and including the rheostat $m$, arranged and adapted to operate substantially as set forth.

In witness whereof we have hereunto signed our names in the presence of two subscribing witnesses.

MARCEL DEPREZ.
JULES CARPENTIER.

Witnesses:
ROBT. M. HOOPER,
DE RANOJEMUNTT.